United States Patent [19]

Iida et al.

[11] Patent Number: 4,889,967
[45] Date of Patent: Dec. 26, 1989

[54] PLURAL WELDING ROD WELDING APPARATUS

[75] Inventors: Hajime Iida; Tadashi Nakamura, both of Shiga, Japan

[73] Assignee: Takao Kinzoku Kogyo Co., Ltd., Shiga, Japan

[21] Appl. No.: 233,105

[22] Filed: Aug. 17, 1988

[30] Foreign Application Priority Data

Dec. 3, 1987 [JP] Japan .................... 62-185290[U]

[51] Int. Cl.⁴ ............................................. B23K 11/10
[52] U.S. Cl. ........................................ 219/87; 219/89
[58] Field of Search .................................. 219/87, 89

[56] References Cited

U.S. PATENT DOCUMENTS

| 2,237,747 | 4/1941 | Platz | 219/89 |
| 2,481,844 | 9/1949 | Johnson | 219/87 |
| 2,714,150 | 7/1955 | Kaiser | 219/4 |
| 2,832,882 | 4/1958 | Bieri | 219/89 |
| 2,929,915 | 3/1960 | Taylor et al. | 219/89 |
| 2,964,611 | 12/1960 | Boretti | 219/89 |
| 4,135,076 | 1/1979 | Beneteau | 219/89 |

Primary Examiner—Clifford C. Shaw
Attorney, Agent, or Firm—Armstrong, Nikaido, Marmelstein, Kubovcik & Murray

[57] ABSTRACT

Each electrode rod unit is composed by inserting into a cylindrical block an electrode rod which is linked to the cylindrical block through a conductive cable. The electrode rod unit is removable fastened onto an electrode plate and pipings for both cooling and pushing out each electrode rod and a fluid pressure piping for its retraction are joined to the electrode unit.

8 Claims, 3 Drawing Sheets

FIG. 2
FIG. 3
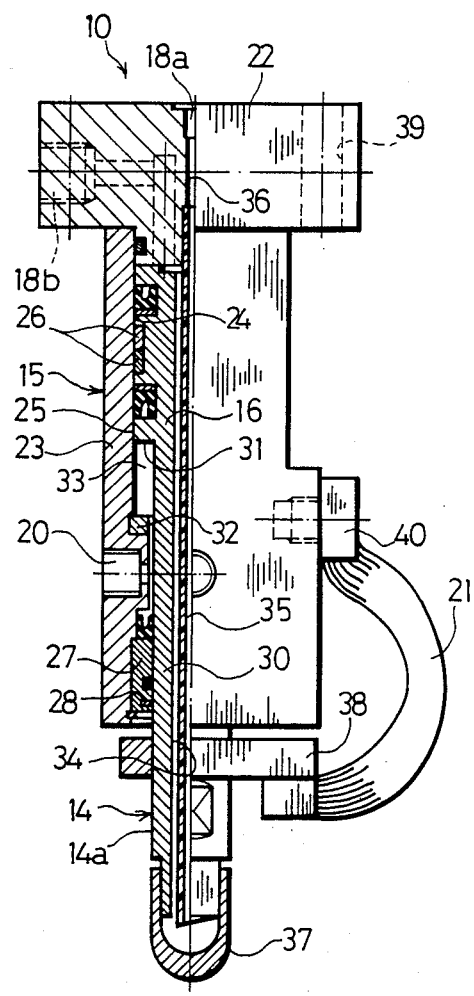
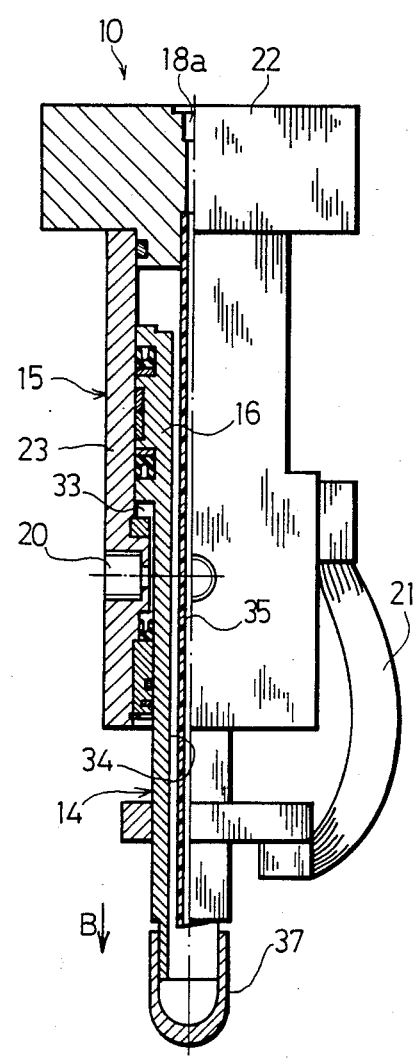

PLURAL WELDING ROD WELDING APPARATUS

BACKGROUND AND SUMMARY OF THE INVENTION

The present invention relates to a welding equipment and more particularly, pertains to a welding equipment for simultaneously performing welding on a work at a plural number of spots, using a plural number of welding rods.

Heretofore, with welding equipment of this type, welding has been performed by vertically moving a mounting block on which a plural number of pieces of electrode rods are mounted. In this instance, it is impossible to alter the distance between each two pieces of a plural number of pieces of electrode rods arranged on the mounting block; accordingly, in order to deal with different distances between respective two welding spots, fitting of different mounting blocks is necessary, with ensuing time and trouble. And fitting a large number of electrode rods requires a large space, approaching small distances is also difficult and altering their fitting angle is quite difficult, with differing mounting blocks required every time the work configuration is changed.

Against this background, it is an object of this invention to provide a welding equipment which permits minimization of between-electrode distance.

Another object of this invention is to provide a welding equipment which permits quite easy alteration of pitch and fitting angle of each electrode rod.

Other objects, characteristic features and benefits of this invention will become evident from the description taken hereunder in conjunction with the accompanying drawings.

BRIEF DESCRIPTION OF THE DRAWINGS

FIG. 2 is a front view in an enlarged half-cut section of an electrode rod unit, when the electrode rod has been retracted;

FIG. 3 is a front view in an enlarged half-cut section of an electrode rod unit, when the electrode rod has been extended.

DESCRIPTION OF THE PREFERRED EMBODIMENTS

Figure 1:
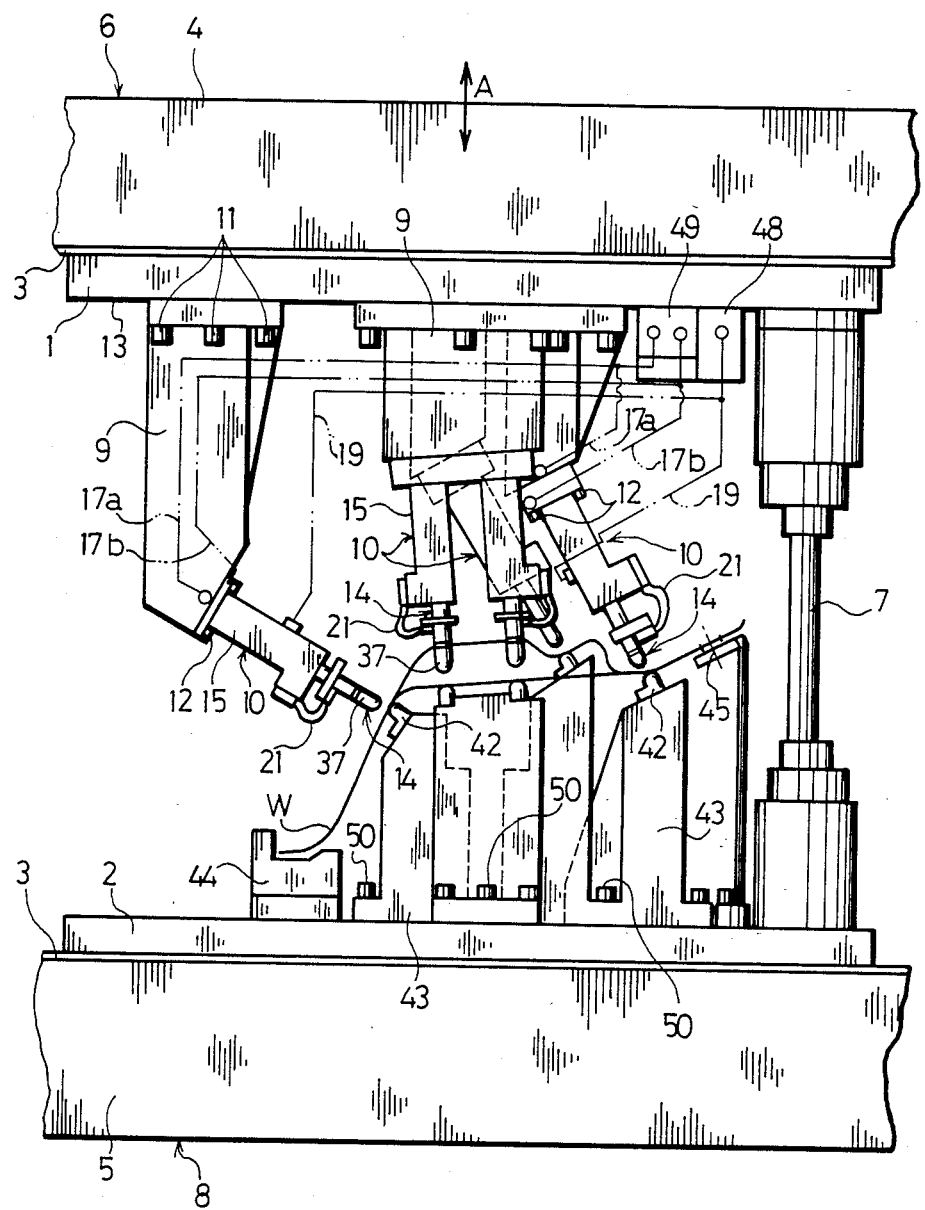
FIG. 1 is a schematic front view showing a working example of the welding equipment of this invention.

As describing this invention with reference to the accompanying drawings, in FIGS. 1 and 2, 6 represents an upper frame adapted to vertically move along a guide post 7 as shown by the arrow mark A by means of a press or crank mechanism which is installed outside the part shown in this drawing, which frame is comprised of an upper base plate 4 and an upper electrode plate 1 mounted on the base plate 4 through an insulating material 3. And 8 denotes a lower frame fixed at a position downward of the substrate frame not shown in this figure, which lower frame is comprised of a lower base plate 5 and a lower electrode plate 2 which is mounted on said lower base plate 5 through an insulating material 3.

Thus on the upper electrode plate 1, a plurality of electrode rod units 10 . . . are removably fitted through upper adaptors 9 . . . of various configurations. The upper adaptors 9 are fixed on the lower surface 13 of the upper electrode plate 1 by means of such coupling means 11 . . . as bolts, etc., and further, on the bottom portion of the upper adaptor 9 . . . , the electrode rod unit 10 . . . is fitted by means of such a coupling means 12 as bolts, etc.

The electrode rod unit 10 has a single piece of electrode rod 14 inserted in each cylindrical block 15 for reciprocal movement, with the electrode rod 14 and said cylindrical block 15 linked through an electrically conductive cable 21.

The cylindrical block 15 consists of a flanged part 22 through which fluid passing ports 18a, 18a are opened and a cylindrical part 23 with a fluid pressure communicating port through which oil or the like fluid passes in or out opened, and the electrode rod 14 consists of a pipe shape body 14a with a large diameter piston part 16 formed at its root and a tip member 37 which covers the tip opening of the body. In a circumferential groove on the outer peripheral surface 25 of the piston part 16, sliding rings 26, 26 made of an insulating material are inserted and between the inner peripheral surface 24 of the cylindrical part 23 and the outer peripheral part of the body 14a, there is interposed on its tip side a scraper holder 27 made of an insulating material on which a scraper 28 made of a metal is firmly fixed. Between the outer peripheral surface 25 of the piston 16 and the internal peripheral surface 24 of the cylindrical part 23, very small gap is actually formed, which is not shown in this figure. Accordingly, the movably contacting part between the electrode rod 14 and the cylindrical block 55 is electrically insulated.

At the central portion of the cylindrical part 23, a sheet body 32 as a cushion material is outfitted and between the sheet body 32 and the piston part 16, there is formed a fluid pressure chamber 33 into which such fluid as working oil, etc., flows. This fluid pressure chamber 33 is communicatively coupled to the fluid pressure communicating port 20.

Through the axial bore 34 of the electrode rod 14, a cooling pipe 35 made of a synthetic resin, etc., is inserted. And the root part of the cooling pipe 35 is communicatively coupled to a pressure fluid supply route 36 in the flanged part 22 and opened at the upper surface of the flanged part 22 through the fluid passing ports 18a. The passing port 18a is communicatively coupled to a supply bore preliminarily formed through a mounting surface of the adaptor 9 and this supply bore is removably joined to a piping 17a by way of screw coupling, etc.

The electrically conductive cable 21 has its one end fixed to the outside circumferential surface of the cylindrical part 23 through a coupling means 40, and the other end to the tip side of the electrode rod 14 through a fitting 38.

In the flanged part 22, bolting holes 39, 39 for its coupling with the adaptor 9 are pierced. And the coupling between the flanged part 22 and the cylindrical part 23 is provided by means of fixtures like bolts, etc.

In this welding equipment, the electrode rod unit 10, being composed by inserting an electrode rod 14 into a cylindrical block 15 and connecting them with an electrically conductive cable 21, is indirectly mounted on the electrode plate 1 through the adaptor 9; thereafter, pipings 17a, 17b both for cooling and pushing out the electrode rod 14 are removably joined to this unit 10 by way of screw coupling, etc., and further, a piping for hydraulic or other fluid pressure for retracting the electrode rod is connected thereto by way of screw coupling, etc.

Thus, as shown in FIG. 1, each electrode rod unit 10 ... is fixed to the adaptor 9 ..., such that the electrode rod 14 makes an appropriate angle to the bottom surface 13 of the upper electrode plate for it to correspond to the welding spot on he work W. And in postures facing the electrode rods 14 ... held at such various fitting angles, there are arranged stationary electrode parts 42 ... on the back side of the work W, the electrode parts 42 ... being mounted on lower adaptors 43 ... which are affixed on the lower electrode plate 2. Numeral 44 designates a member for defining the shape and position of the work W, and 45 a reference positioning member. The lower adaptors 43 ... are also removably fastened with coupling means 50 ....

On the upper electrode plate 1, there are provided hydraulic terminal 48 and water or other fluid pressure terminals 49 for cooling and pushing out electrode rod, from which oil and other pressure fluids are fed to each unit 10 through pipings 19, 17a and 17b.

Accordingly, as the pressure fluid is fed through the passing port 18a, the electrode rod 14 goes forward in the direction of the arrow mark B, as shown in FIG. 3, while cooling the tip member 37. And under this state, as such a fluid as air or other gas is let flow from the fluid pressure passing port 20 into the fluid pressure chamber 33, the electrode rod 14 goes back, returning to its former state, as shown in FIG. 2.

A transformer, not shown in this figure, is installed on the upper frame 6; there is continuity from the plus side of the transformer to the electrode rod 14 ... through the upper adaptor 9 ..., cylindrical block 15 ... and a conductive cable 21 and the minus side is conductively linked to the electrode parts 42 ... through lower adaptors 43 .... The pressure fluid pipings 17a, 17b ... and the fluid pressure piping 19 ... are connected to a pump, etc., of fluid pressure units (not shown in this figure) respectively through terminals 48, 49.

Figure 4:
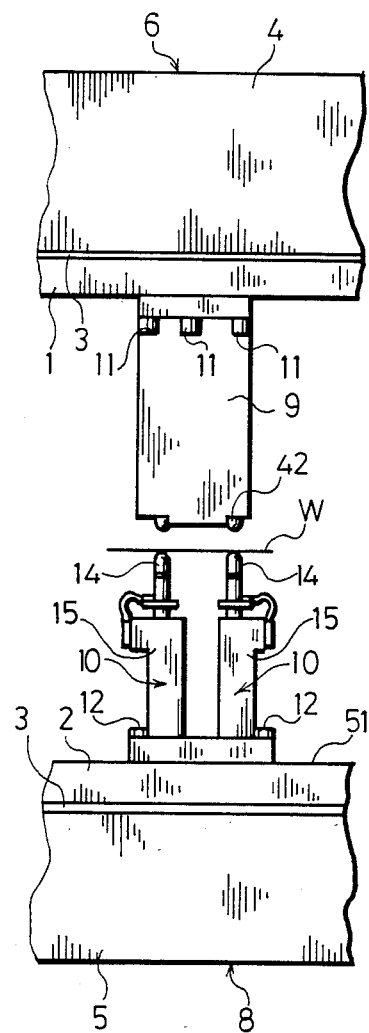
FIG. 4 is a schematic front view of the essential part of another embodiment.

Next, FIG. 4 gives another working example; in this welding equipment, electrode rod units 10 are directly mounted on the lower electrode plate 2. Thus the electrode rod units 10 are set on the upper surface 51 of the lower electrode plate 2 by such coupling means 12 as bolts, etc., while the electrode parts 2 are mounted on the upper adaptor 9 which is fixed on the upper electrode plate 1.

Thus in the welding equipment of this invention, it is only proper for the cylindrical part 23 of each cylindrical block 15 ... to have such a configuration and dimensions as to accommodate a single electrode rod 14, thus permitting electrode rod unit 10 ... to be made compact. Consequently, it becomes possible to install the cylindrical blocks 15 in proximity to each other, minimizing the pitch between electrode rods 14 ... which are mounted on the electrode plate 2.

The mounting and dismantling of electrode rod units 10 ... may be done easily and quickly, facilitating changes of pitch between respective electrode rods 14 ... and their fitting angle.

We claim:

1. A welding equipment having a plurality of fixed electrodes and a plurality of movable electrode rod units opposing said fixed electrodes characterized in that each electrode rod unit of said plurality of movable electrode rod units is composed of a single electrode rod reciprocally inserted for reciprocal movement in a cylindrical block with said electrode rod and said cylindrical block in each said electrode rod unit linked with a conductive cable and said plurality of electrode rod units being individually removably mounted on an electrode plate through adaptors, first fluid pressure piping connected to each said cylindrical block for fluid for both cooling said electrode rod unit in said cylindrical block and the tip thereof and for pushing out said electrode rod from said cylindrical block and a second fluid pressure piping connected to each said cylindrical block for retracting said electrode rod into said cylindrical block, said first and second fluid pressure pipings being removably joined to each said electrode rod unit.

2. The welding equipment according to claim 1, wherein said cylindrical block has flanged parts provided with fluid passage ports to which said first fluid pressure piping for said fluid for both cooling and for pushing out each electrode rod are joined and a fluid pressure passage port to which said second retracting fluid pressure piping is joined, and comprises a cylindrical part in which a piston part of each electrode rod is inserted for reciprocal movement.

3. The welding equipment according to claim 1 wherein said electrode rod units are removably fastened onto said electrode plate by coupling means.

4. The welding equipment according to claim 1 wherein said first fluid pressure piping for said fluid for both cooling and pushing each electrode rod and said second fluid pressure piping for the retraction of said electrode rod are respectively removably fastened to each electrode unit by a screw coupling.

5. A welding equipment having a plurality of fixed electrodes and a plurality of movable electrode rod units opposing said fixed electrodes characterized in that each electrode rod unit of said plurality of movable electrode rod units includes a single electrode rod inserted into a cylindrical block for reciprocal movement in said block and for linking said electrode rod and said cylindrical block with a conductive cable, a plurality or said electrode rod units removably fastened directly onto an electrode plate and fluid pressure piping for fluid for both cooling and pushing out each electrode rod and fluid pressure piping for fluid for retracting of said electrode rod removably fastened to each electrode rod unit.

6. The welding equipment according to claim 5 wherein said cylindrical block has a flanged part provided with fluid passing ports to which said fluid pressure piping for said fluid for both cooling and pushing out each electrode rod are joined and a fluid pressure port to which said fluid pressure piping for said fluid for retracting is joined and comprises a cylindrical part in which said piston part is inserted for reciprocal movement therein.

7. The welding equipment according to claim 5 wherein said electrode rod units are removably fastened onto said electrode plate by coupling means.

8. The welding equipment according to claim 5 wherein said fluid pressure piping for said fluid for both cooling and pushing out each electrode rod and said fluid pressure piping for said fluid for retracting of said each electrode rod are removably joined to each electrode rod unit, respectively, with screw couplings.

* * * * *